(12) United States Patent
Thomas et al.

(10) Patent No.: US 8,314,994 B1
(45) Date of Patent: Nov. 20, 2012

(54) SCOPE HAVING A ZOOM SLIDER

(75) Inventors: Mitchell Thomas, Sisters, OR (US);
Forrest Babcock, Sisters, OR (US);
Mark A. Thomas, Sisters, OR (US)

(73) Assignee: YT Products, LLC, Sisters, OR (US)

( * ) Notice: Subject to any disclaimer, the term of this patent is extended or adjusted under 35 U.S.C. 154(b) by 82 days.

(21) Appl. No.: 12/627,350

(22) Filed: Nov. 30, 2009

Related U.S. Application Data

(60) Provisional application No. 61/271,972, filed on Jul. 29, 2009.

(51) Int. Cl.
*G02B 15/14* (2006.01)

(52) U.S. Cl. .......... 359/676; 42/119; 359/694; 359/704; 359/822

(58) Field of Classification Search .......... None
See application file for complete search history.

(56) References Cited

U.S. PATENT DOCUMENTS

| | | | | |
|---|---|---|---|---|
| 2,399,658 A * | 5/1946 | Banker | ...... | 359/489.2 |
| 2,425,713 A * | 8/1947 | Applegate | ...... | 356/12 |
| 2,755,701 A * | 7/1956 | Altman | ...... | 359/690 |
| 3,028,791 A * | 4/1962 | Clark et al. | ...... | 359/422 |
| 3,106,125 A * | 10/1963 | Martin et al. | ...... | 359/696 |
| 3,178,994 A * | 4/1965 | Lang | ...... | 359/367 |
| 5,434,704 A * | 7/1995 | Connors et al. | ...... | 359/403 |
| 5,732,290 A * | 3/1998 | Shimose et al. | ...... | 396/83 |
| 6,222,684 B1 * | 4/2001 | Nishimura | ...... | 359/740 |
| 6,724,541 B2 * | 4/2004 | Noguchi | ...... | 359/700 |
| 7,961,381 B2 * | 6/2011 | Pochapsky | ...... | 359/353 |
| 2004/0190160 A1 * | 9/2004 | Nishimura | ...... | 359/699 |
| 2006/0072214 A1 * | 4/2006 | Kawaguchi | ...... | 359/704 |
| 2011/0041377 A1 * | 2/2011 | Thomas et al. | ...... | 42/120 |

* cited by examiner

*Primary Examiner* — Michael Carone
*Assistant Examiner* — Samir Abdosh
(74) *Attorney, Agent, or Firm* — Timothy E Siegel Patent Law, PLLC; Timothy E Siegel (57) ABSTRACT

A scope having a zoom mechanism that includes a cam tube holding an optical train of lenses whose relative positions change when said cam tube is rotated, causing an image seen through the scope to expand or contract. A gear is in contact to said cam tube and is positioned so as to rotate said cam tube when said gear is rotated. Finally, an actuator is positioned on a side of said scope and operatively connected to said gear so that said actuator causes said gear to turn when a user moves said actuator.

3 Claims, 14 Drawing Sheets

SCOPE HAVING A ZOOM SLIDER

RELATED APPLICATION

This application claims priority from application 61/271,972, filed Jul. 29, 2009, which is incorporated by reference as if fully set forth herein.

BACKGROUND

This invention relates to variable power sighting scopes, and in particular to a scope that provides magnification zoom ratios greater than are currently feasible. A rifle scope serves to magnify the target and overlay a visual aiming point, the reticle, on the target. It does this through the use of a series of lenses mounted within a generally tubular body and a combination of mechanisms to adjust lens positions.

The lenses in a scope can be generally divided into three groups: the objective lens group; the erector lens group; and the ocular (or eyepiece) lens group. Depending on the particular design there may be one or more individual lenses in each group within a scope. The erector lens group gets its name from its role in inverting the first intermediate image, which would appear inverted (ie. upside down and flipped horizontally) to a viewer, so that the image will appear "erect" or upright to the viewer. Because of this role, any lens or other optical device that inverts an intermediate image will be termed an erector device or assembly in this application. The objective lens group gathers in the light from the target and projects the target image as a magnified and inverted first intermediate image. The erector lens group projects the first intermediate image to a magnified or reduced, and re-inverted, second intermediate image. The ocular lens group presents the second image to the eye for viewing.

In a typical scope, the erector lens group is part of an erector lens assembly, which includes a guide tube that carries the erector lenses. The guide tube is mounted so that it pivots at one end, with the opposite end being adjustable horizontally and vertically to provide windage and elevation correction.

Variable magnification can be achieved by providing a means of adjusting the position of the erector lenses in relationship to each other within the guide tube. This is typically done through the use of a cam tube which fits closely around the guide tube.

Each erector lens (or erector lens subgroup) is mounted in a lens mount which slides within the guide tube. A guide sleeve attached to the lens mount slides in a straight slot in the body of the guide tube to maintain the orientation of the erector lens. This same guide sleeve also engages an angled, or curving, slot in the cam tube. Turning the cam tube causes the erector lens mount to move along a portion of the length of the guide tube, varying the magnification. Each erector lens or lens group has its own slot in the cam tube, with the configuration of these slots determining the amount and rate of magnification change as the cam tube is turned. Each erector lens mount has a slot follower that fits into the corresponding cam slot.

A typical rifle scope includes a windage and an elevation knob, for adjusting the apparent position of the reticle relative to a zero position, which in windage is ideally the rifle bore sight, but in elevation is, ideally the rifle bore sight plus a slight down angle, to compensate for bullet drop at some nominal range on the order of 100 yards.

Another disadvantage of the windage and elevation knob design, is the typical placement of the knobs in the center of the scope. This limits the placement of a hunter's scope, which is held by a set of mounting rings. It can be desirable to mount a scope fairly far forward to accommodate eye relief (the ideal distance from the eyepiece of the scope to place one's aiming eye). The effort to mount the scope forward on the rifle is sometimes stymied at the point where the windage knob is blocked by the front mounting ring. It would be desirable to have a scope without the structure of the windage and elevation knobs in the middle of the scope, to permit greater freedom of scope placement, when held in place by mounting rings.

The windage and elevation knobs typically change the apparent reticle position by changing the angle of the erector assembly relative to the scope housing. To maximize this affect, it is desirable to have as much air gap between the erector assembly and the scope housing to provide room to change the erector assembly's angular position within the scope housing. This drives the design toward very thin-walled cam tubes. The thin-walled cam tubes are quite delicate and can be easily bent during the manufacturing operation, thereby driving up the reject rate and the costs of manufacturing. The thin-walled cam tubes also decrease the expected useful product life, because each time the rifle is fired the slot follower is jolted violently backwards in its cam slot, potentially damaging the thin-walled tube. This problem is proportional to the caliber of the rifle to which the scope is attached. For .50 caliber rifles, it tends to be impractical to provide a conventional magnifying scope with windage and elevation adjustment due to this problem.

It is also desirable that the cam slots have a constant curvature so that the slot follower can have length along the slot, as opposed to being round. Because, as noted above, rifle scopes suffer repeated recoil shocks, it is desirable to distribute the force from the recoil over a longer slot follower. Changes in cam slot curvature place a limit on the length of a cam slot follower. As the zoom ratio gets larger, it becomes impossible to design a cam slot with constant curvature. Changing slot curvature can also cause a zoom actuator to be more difficult to turn over a portion of its range. Users, however, tend to prefer that an actuator have the same "feel" over its entire range.

In known scope designs the zoom ratio is effectively limited to 4× because increasing the zoom ratio increases the range of spatial relationships between the lenses utilized. This means that different aspects of the lenses' shapes may be critically important at differing zoom settings. In turn, this drives tight tolerances for lens shapes and the means of changing the spatial relationships between the lenses (discussed below), thereby increasing the defect rate, and the cost. Accordingly a need remains for a scope that can provide a zoom ratio greater than 4× without the manufacturing, difficulty of use and lack-of-durability problems arising from the extension of known erector lens assembly designs to provide greater zoom ratios.

Another factor limiting the zoom mechanism is the zoom actuation. Typically, a ring mounted on the scope exterior is attached directly to the cam tube. A slot cut through the scope housing permits the ring to be turned up to a typical maximum of about 180°. But because the direct attachment, the ring cannot be turned further than length of the arc of the slot, which is limited by the need to preserve the structural integrity of the scope housing. It appears that it is known to interpose a gear between a zoom actuation ring and the cam tube, however, thereby obviating the need to have a lengthy slot and permitting cam tube rotation of greater than a one-half rotation. The use of a ring as an actuator is still somewhat awkward, however, as it requires a user to move his hand over the scope to adjust the zoom.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a scope having a zoom mechanism that includes a cam tube holding an optical train of lenses whose relative positions change when the cam tube is rotated, causing an image seen through the scope to expand or contract. A gear is in contact to the cam tube and is positioned so as to rotate the cam tube when the gear is rotated. Finally, an actuator is positioned on a side of the scope and operatively connected to the gear so that the actuator causes the gear to turn when a user moves the actuator.

In a second separate aspect, the present invention may take the form of a scope having a zoom mechanism. The scope has a central tube housing and a cam tube, set in the central tube housing and holding an optical train of lenses whose relative positions change when the cam tube is rotated, causing an image seen through the scope to expand or contract. A slider is positioned longitudinally on the central tube housing and operatively connected to the cam tube, so that as the slider is moved the cam tube is caused to rotate.

In a third separate aspect, the present invention may take the form of a rifle assembly that includes a rifle having a rifle butt and a trigger and a scope attached to the rifle. That scope has a zoom mechanism that has an actuator located on the left side of the scope from the perspective of a right-handed shooter holding the rifle butt against his right shoulder, so that the shooter can adjust the zoom with his left hand while his right hand trigger finger is on the trigger and he is looking through the scope.

In a fourth separate aspect, the present invention may take the form of a scope having a zoom mechanism that includes a cam tube holding an optical train of lenses whose relative positions change when the cam tube is rotated, causing an image seen through the scope to expand or contract. A gear is in contact to the cam tube and positioned so as to rotate the cam tube when the gear is rotated and an actuator is operatively connected to the gear so that the actuator causes the gear to turn when a user moves the actuator. The actuator has a range of movement that permits the actuator to operatively rotate the cam tube by more than a complete rotation.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
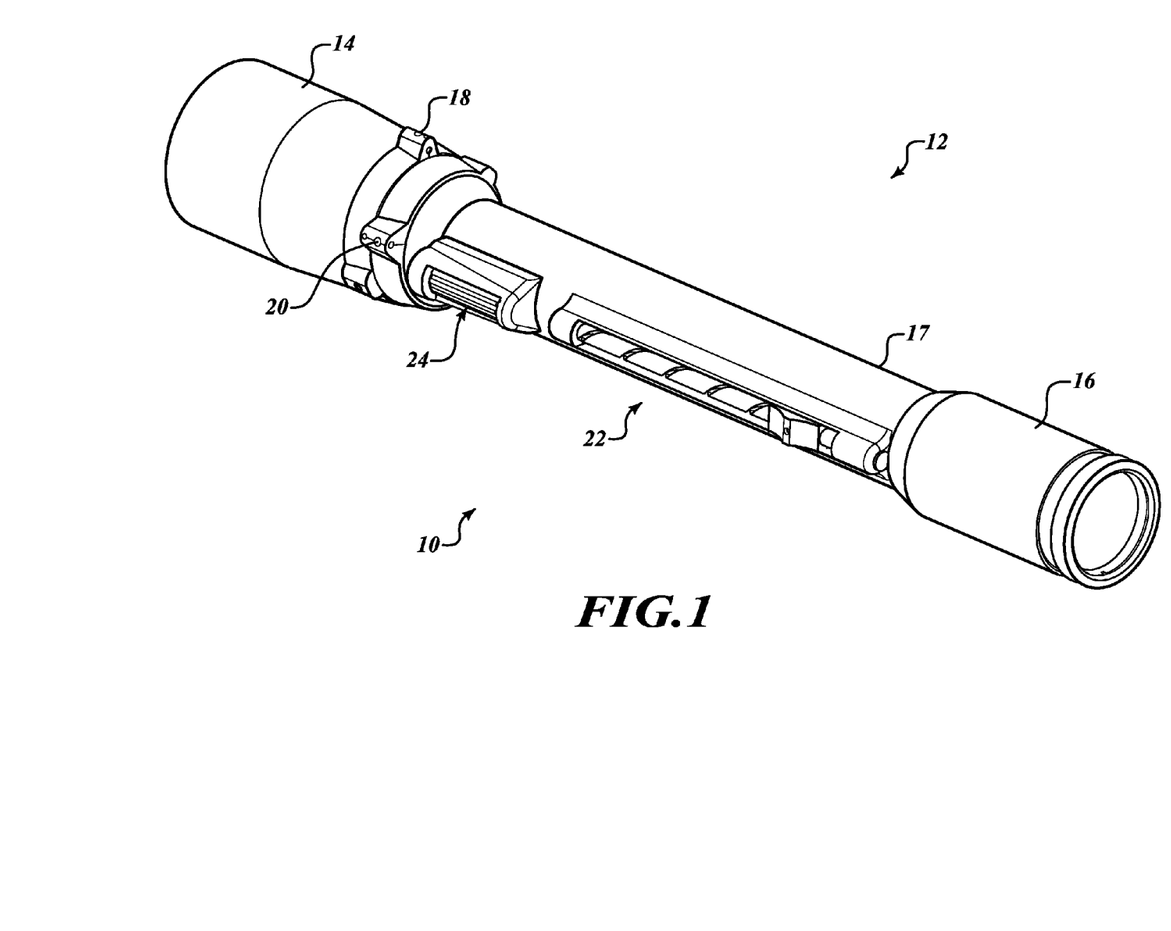
FIG. 1 is a perspective view of a rifle scope according to the present invention.
Figure 2:
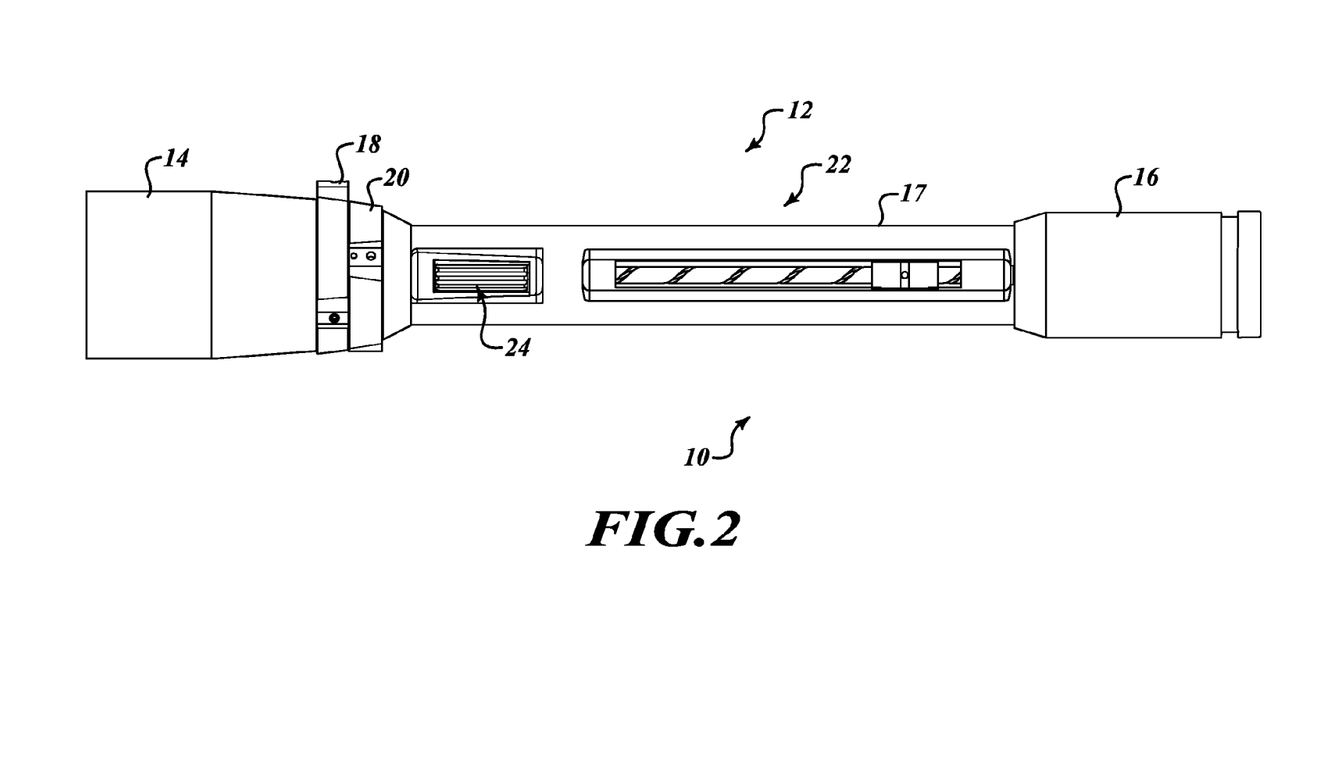
FIG. 2 is a side view of the scope of FIG. 1.
Figure 3:
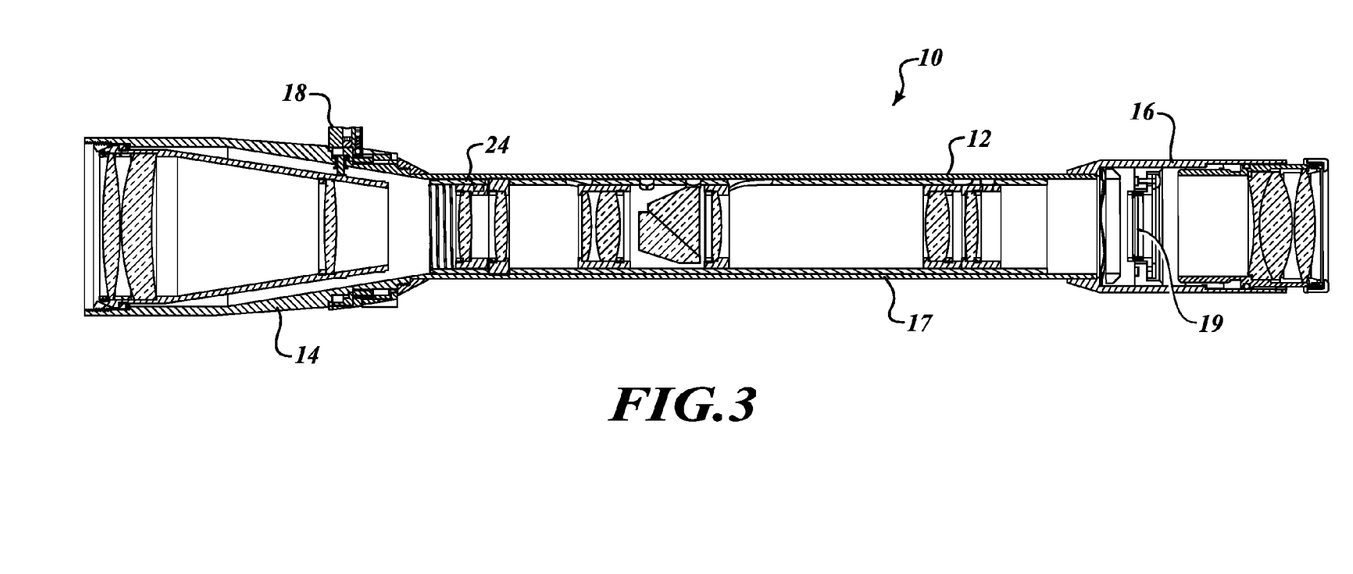
FIG. 3 is a side sectional view of the scope of FIG. 1.

Referring to FIGS. 1, 2 and 3, a scope 10 according to a preferred embodiment of the present invention includes a body or housing 12, which includes an objective assembly outer housing 14, an ocular assembly housing 16, a central tube housing 17 and a reticle 19. In addition a windage adjust assembly 18, an elevation adjust assembly 20 and a zoom actuator assembly 22 permit a range of adjustments.

Figure 4:
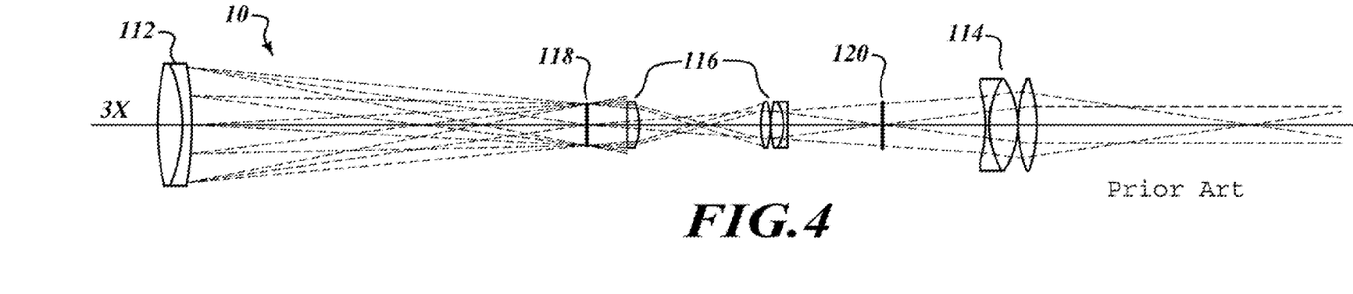
FIG. 4 is a schematic ray trace diagram showing a prior art scope utilizing a single 4× zoom erector assembly and in which the lenses are arranged so that the scope magnifies by 3×.
Figure 5:
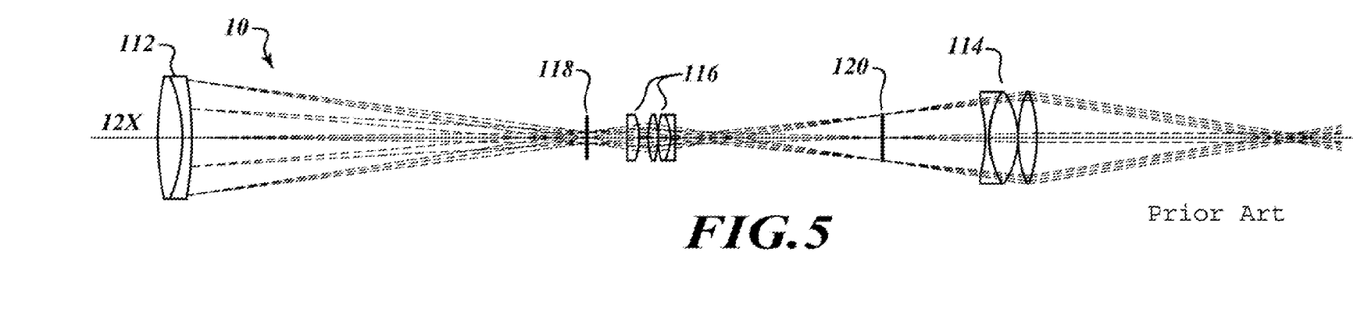
FIG. 5 is a schematic ray trace diagram showing a prior art scope utilizing a single 4× zoom erector assembly and in which the lenses are arranged so that the scope magnifies by 12×.

Referring now to FIGS. 4 and 5, a typical prior art 4× zoom optical scope 110 is illustrated schematically in a ray trace diagram. Scope 110 includes objective lens assembly 112, ocular lens assembly 114, and a single 4× zoom erector lens assembly 116. A first intermediate image 118 is inverted relative to the target, and a second intermediate image 120 is re-inverted, to appear correctly oriented to a viewer looking through ocular lens assembly 114. In FIG. 4 the erector lens assembly 116 is configured to provide a magnification of 1×, whereas in FIG. 5 it is configured to provide a magnification of 4×.

Figure 6:
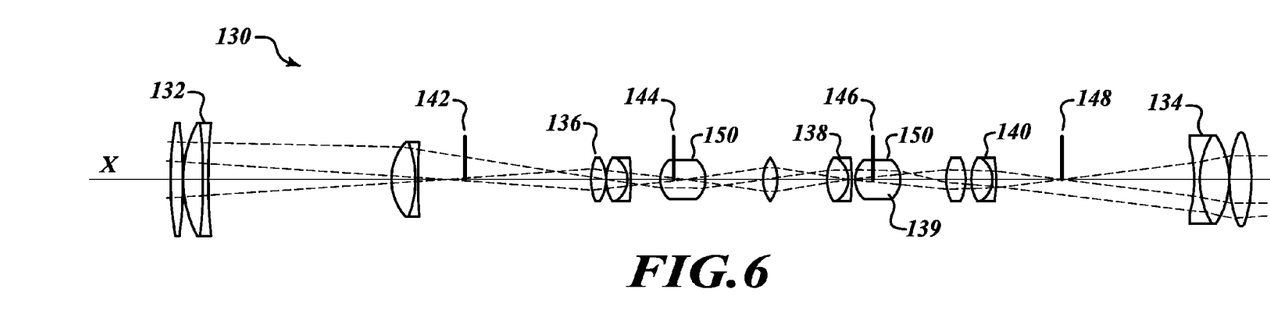
FIG. 6 is ray trace diagram showing a first embodiment of the invention incorporating three erector lens assemblies and in which the lenses are arranged so that the zoom mechanism does not magnify the image.
Figure 7:
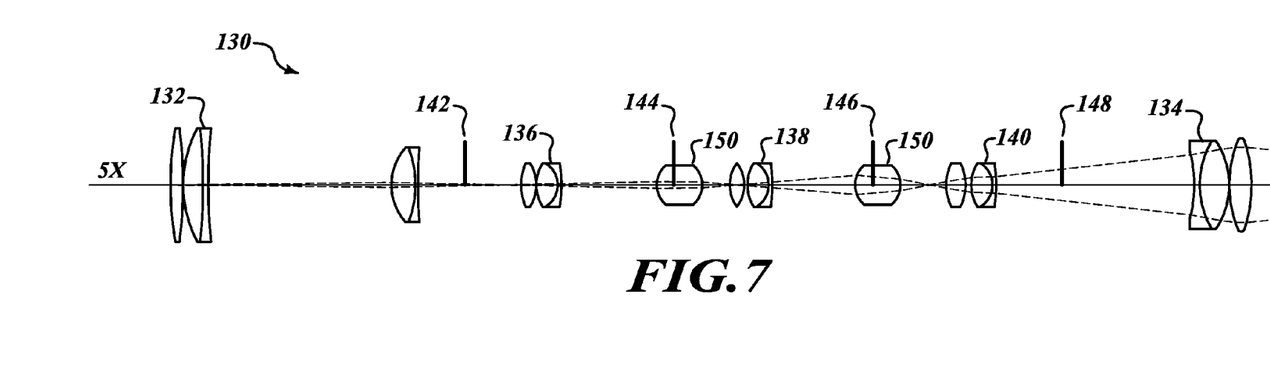
FIG. 7 is ray trace diagram showing a first embodiment of the invention incorporating three erector lens assemblies and in which the lenses are arranged so that the zoom mechanism magnify the image by 15×.

For a scope having a length of less than 20 cm a zoom ratio of about 4× to 6× represents the practical limit of a single erector assembly scope given the design and manufacturing complexities and tight tolerances encountered when a greater zoom ratio is attempted. Turning now to FIGS. 6 and 7, a first embodiment of a scope optical train, according to the present invention is shown schematically at 130. FIG. 6 shows a scope 130 configured for a 1× zoom, while FIG. 7 shows scope 130 configured for a 15× zoom. Scope 130 includes objective lens group 132, ocular lens assembly 134, first erector lens assembly 136, second erector lens assembly 138 and third erector lens assembly 140. In this embodiment objective lens assembly 132 is a triple lens assembly according to a typical known arrangement. An image is projected through lens assembly 132 to provide a first intermediate image 142, which is projected through the first erector lens assembly 136 to generate a second intermediate image 144, which as it is inverted relative to the first image 142 is oriented correctly for viewing. Second image 144 is, in turn, projected through second erector assembly 138 to generate a third intermediate image 146, which in turn is transmitted through third erector assembly 140 to generate fourth intermediate image 148. Because image 148 has been inverted twice, relative to the second image 144, it is oriented correctly for viewing by the human eye. The fourth image is then transmitted through ocular lenses 134 to a viewer using the scope 130.

It has been found that some optical artifacts may occur along the optical train described above. To prevent these artifacts, non-magnifying spheroid or "field" lenses 150 are interposed in the optical train.

Turning now to FIGS. 8, 9, 10 and 11 which show the optical train of another embodiment of a scope 200, in schematic, ray trace form. In this embodiment the second (central) erector assembly 204 is a roof prism rather than an adjustable, magnifying erector lens assembly as in scope 130. First erector assembly 202 projects an inverted image at the longitudinal middle of prism 204. Third erector assembly receives this image and projects an inverted image that ocular lens assembly 208 receives and presents to the eye of a user. First erector assembly 202 includes a focus or collector lens group 202a and a zoom lens group 202b. In like manner third erector assembly 206 includes a focus lens group 206a and a zoom lens group 206b. The focus lens groups 202a and 206a do help the zoom, but principally they maintain the focus over magnification changes and the zoom lens group 202b and 206b do help focus, but principally they zoom.

Figure 8:
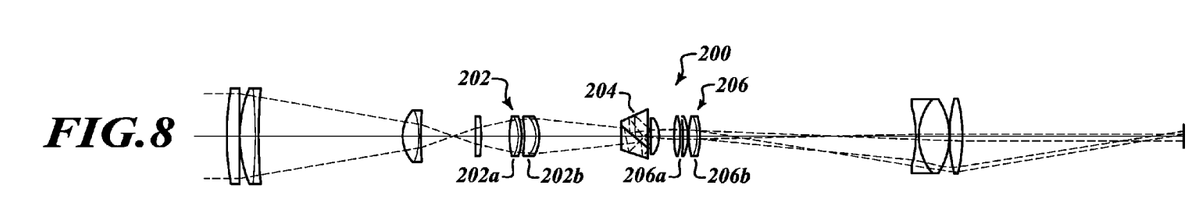
FIG. 8 is a ray trace diagram showing a second embodiment of a rifle scope according to the present invention, which incorporates two erector lens assemblies in combination with a roof prism erector, configured to provide 15× magnification.
Figure 9:
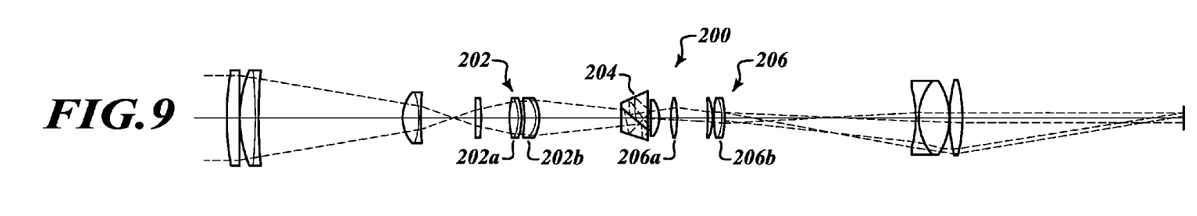
FIG. 9 is a ray trace diagram of the rifle scope of FIG. 6, configured to provide 10× magnification.

FIG. 8 shows the optical train of scope 200 as it is configured at its highest power 15× magnification setting. FIG. 9 shows the optical train of scope 200 as it is configured at a 10× power setting. The zoom lens group 206b of third erector assembly 206 has been moved rearward, relative to the configuration shown in FIG. 8.

Figure 10:
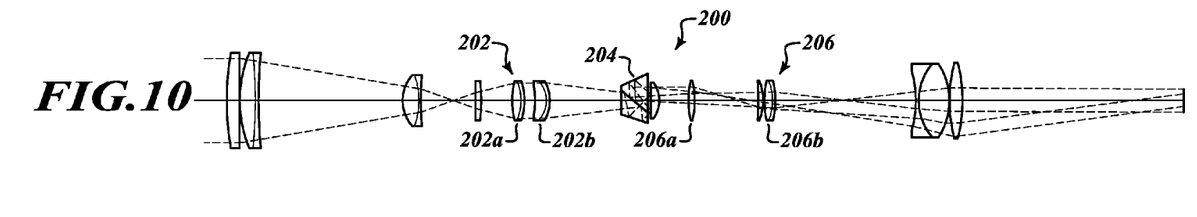
FIG. 10 is a ray trace diagram of the rifle scope of FIG. 6, configured to provide 5× magnification.
Figure 11:
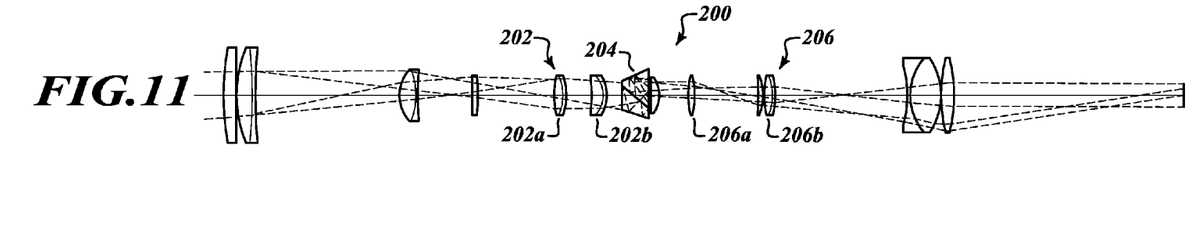
FIG. 11 is a ray trace diagram of the rifle scope of FIG. 6, configured to provide 1.5× magnification.

FIG. 10 shows the optical train of scope 200 as it is configured at a 5× power setting. The zoom lenses 206b of the third erector assembly 206 have been moved back further, and the zoom lens 202b of the first erector assembly 202 has also been moved back. FIG. 11 shows the optical train of scope 200 as it is configured at a 1.5× power setting. Both the focus lens 202a and the zoom lens 202b of the first erector assembly 202 are moved rearward relative to the configuration of FIG. 10 as are the zoom lenses 206b of third erector assembly 206.

Figure 12A:
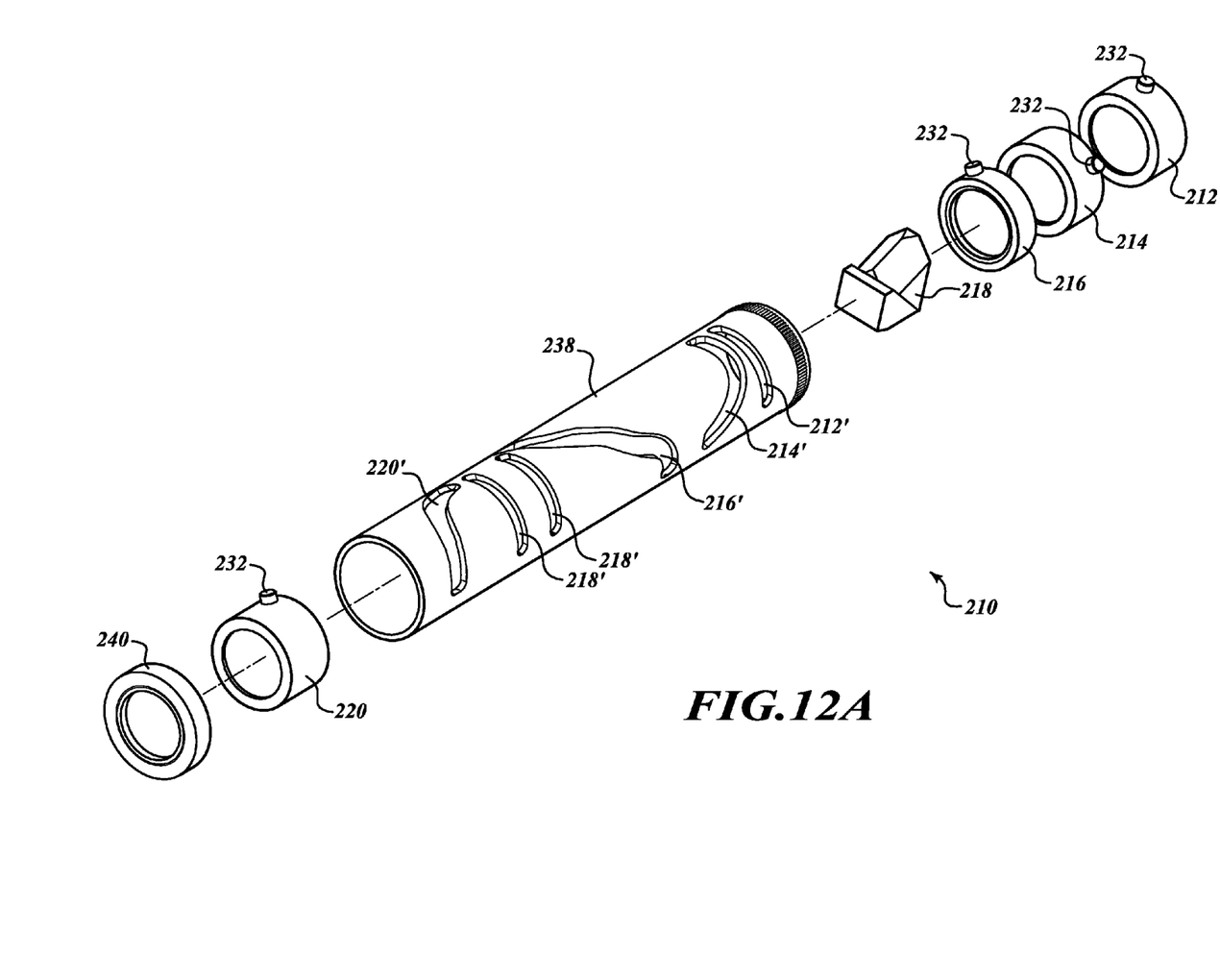
FIG. 12A is a perspective view of the cam tube and a set of lenses and lens mounts, removed from the cam tube for ease of presentation but maintained in orientation, used in the erector assembly of the rifle scope according to the present invention.
Figure 12B:
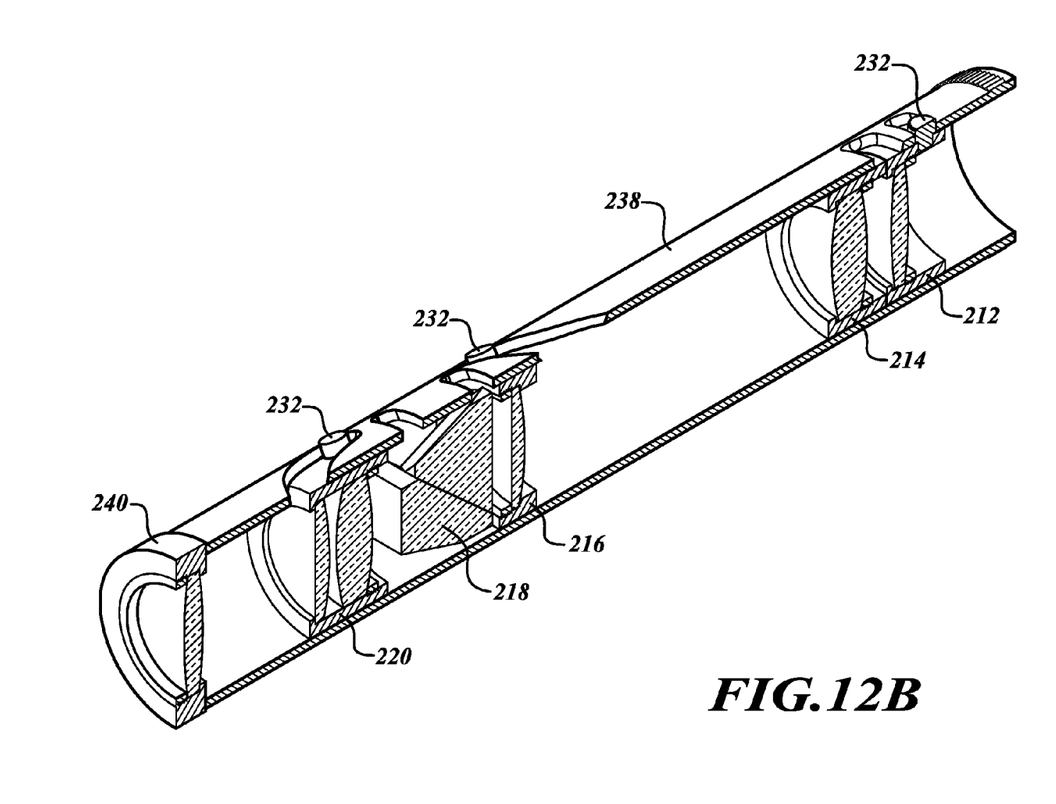
FIG. 12B is a perspective sectional view of the cam tube and a set of lenses and lens mounts used in the erector assembly of the rifle scope of FIG. 12A.

FIGS. 12A and 12B show a preferred embodiment of a mechanism 210 for implementing a moveable lens train similar to that of FIGS. 8-11. Lens mounts 212, 214, 216, and 220 and roof prism 218 are hosted by cam tube 230, with each lens mount pin 232 being accommodated by cam tube slot 212', 214', 216', 220' and slots 218', respectively. Roof Prism 218 has a roof prism mount that has a pair of pins similar to pins 232, but these elements are not shown in the drawing, for ease of presentation. Pins 232 fit through their respective slots and into a slot formed in the top-interior of the central tube housing 17. An actuator permits a user to rotate cam tube 238, thereby moving lens mounts 212 through 220 longitudinally, according to a scheme manifested by the cam slots 212' through 220'. The fact that pins 232 are fit into the slot (not shown) in the top-interior of the housing 17, prevents the lenses and prism 212 through 222 from rotating as they translate longitudinally. Lens 240 is a fixed, field collector lens. In one preferred embodiment, two identical 3× zoom assemblies of well known design are entrained to form a 9× zoom.

Figure 13A:
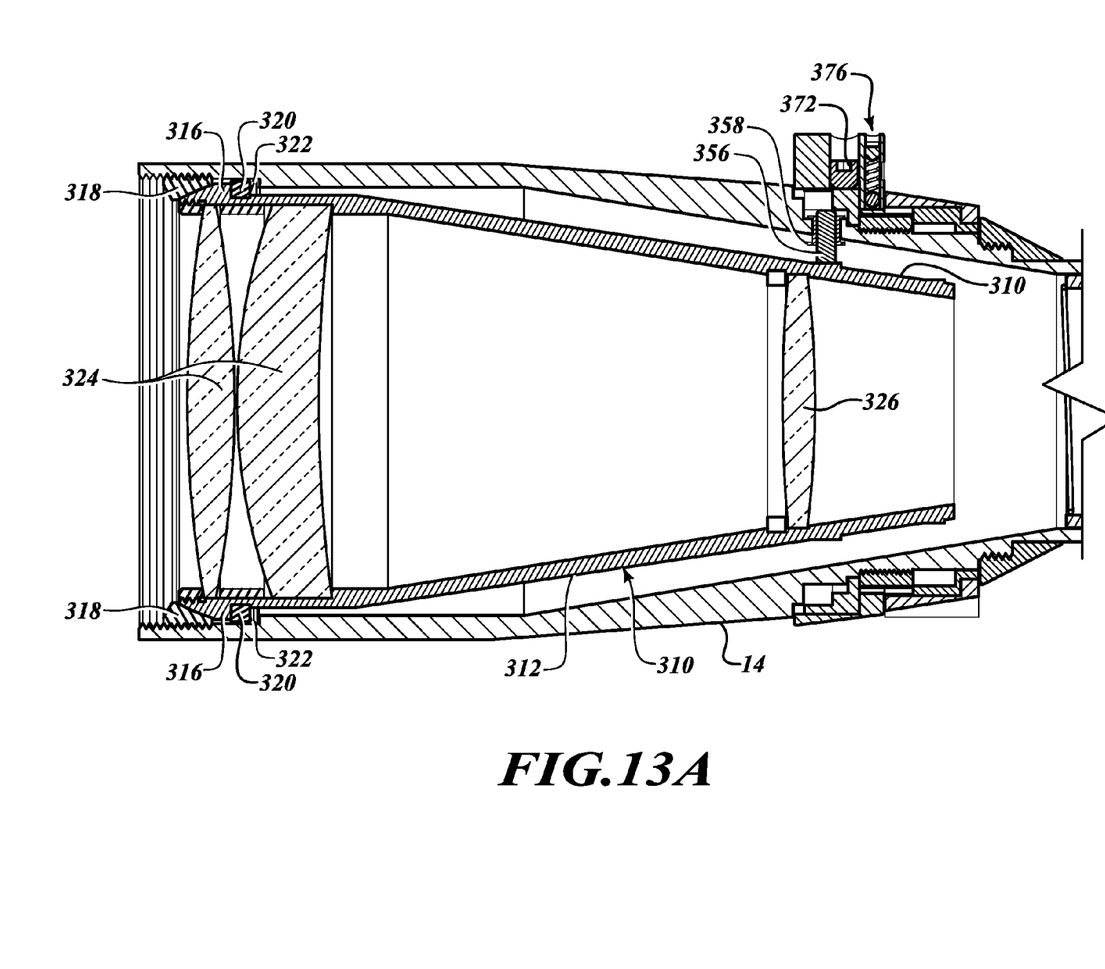
FIG. 13A is a detail of the objective assembly of the scope of FIG. 1.

FIG. 13A is a side-sectional view of an objective assembly 310 having a housing 312, that fits into the objective assembly exterior housing 14. Housing 312 can pivot, in exterior housing 14, in order to permit windage and elevation adjustment, while not breaking a water resistant seal at the front end of scope 10. To achieve this object, assembly housing 312 includes a rim having a forwardly inward-sloping surface 316, which mates with a ball seat-ring 318 having matching curvature. Accordingly, surface 316 fits into ball seat-ring 318 in such a manner that a seal is formed that permits the pivoting of objective assembly 310. An O-Ring 320 and a torroid-shaped spring 322 ensure that surface 316 is forced into seat-ring 318 with sufficient pressure to maintain a good seal. Objective lens pair 324 and lens 326 focus light in a first image plane and have a combined nodal point that is between the two lens groups. Because the pivot point is far forward, with the front of housing 312 rocking in the ball seat ring 318, the pivot point is separated from the nodal point of the objective assembly 310. If the pivot point were coincident with the nodal point of assembly 310, it would cause aberrations in the image presented to the viewer. In an alternative preferred embodiment, not shown, the objective assembly is translated transversely, to cause a misalignment of its centerline with that of the subsequent optical train. With this embodiment the potential problem of a coincidence of the nodal point with the pivot point is eliminated, as there is no pivot point. Accordingly the objective assembly can be shortened and reduced to a single lens group.

Figures 13B, 13C:
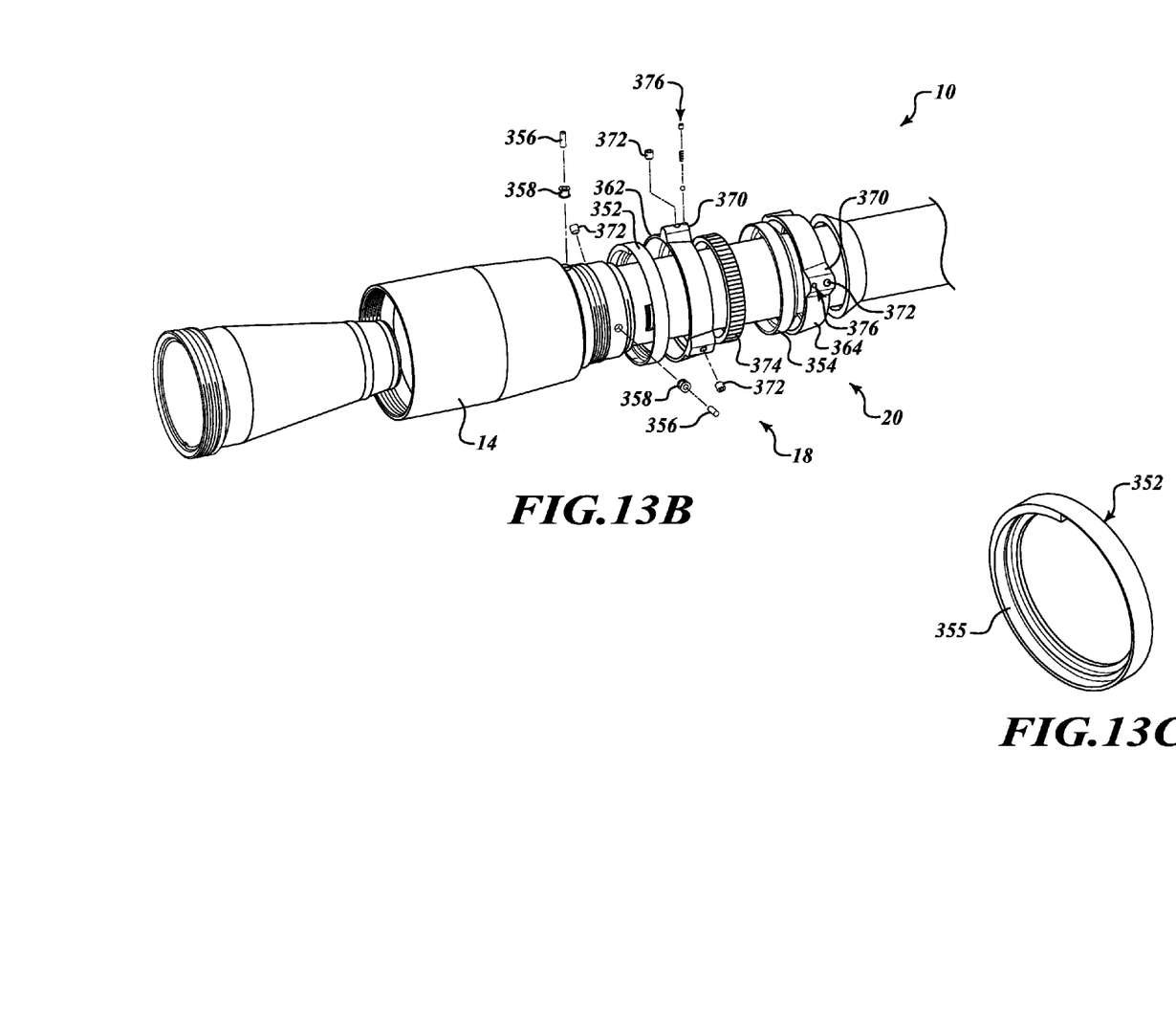
FIG. 13B is a perspective exploded view of the assembly of FIG. 13A.
FIG. 13C is a detail, expanded view of the windage drive ring of the assembly of FIG. 13A.

Referring to FIGS. 13A and 13B, windage adjust assembly 18 and an elevation adjust assembly 20 both use a set of rings to adjust windage and elevation. A windage drive ring 352 (FIG. 13C) and an elevation drive ring 354 both have a uniformly circular outer surface, but a varying thickness, so that an interior surface 355 is displaced from the outer surface by a distance that changes in a uniform manner over a "drive range," which in one preferred embodiment is a complete rotation. The interior surface contacts a drive pin 356, retained by seal 358, which contacts a side-rear surface of objective assembly 310, so that as the drive ring 352 or 354 is rotated the pin 356 is either pushed inwardly or permitted to retract, so that the rear of objective assembly 310 is pushed to a new position, or permitted to move back to a more centered orientation, as it is urged to do by torroid spring 322.

A windage marking ring 362 and an elevation marking ring 364 are engaged about windage drive ring 352 and elevation drive ring 354, respectively. Additionally, each marking ring 362 and 364 has a prominence 370 that is visible to a shooter having one eye looking through the scope, so that he may easily check the windage and elevation settings without taking his eye off a target. In a preferred embodiment each prominence 370 has a different appearance when viewed from the rear, so that they can be distinguished without the need for any depth perception on the part of the user. Each marking ring 362 and 364 may be disengaged from its drive ring 352 and 354, respectively, by loosening a pair of zero adjust set screws 372. This permits a user to adjust the relationship between windage and elevation ring position and apparent reticle pointing direction, to compensate for errors in scope orientation, so that the reticle may be well-aligned with an ideal orientation, such as rifle bore-sight plus a slight upward tilt, to permit bullet drop at a nominal range of perhaps 100 meters. This may be done by placing scope into the ideal, desired orientation, disengaging the marking ring 362 or 364 from the drive ring 352 or 354, moving the marking ring 362 or 364 to a predetermined zero position and re-engaging the marking ring 362 or 364 to its drive ring 352 or 354, respectively. Subsequent apparent reticle movements are then made relative to the ideal zero position.

Finally, a click ring 374, having a set of circumferentially spaced ridges is placed so that it is contacted by one of a pair of spring-loaded clickers 376. As either marking ring 362 or 364 is turned, a clicker 376 makes a click sound each time it is moved past a ridge on click ring 374. Shooters may use this to monitor the amount they have turned ring 362 or 364 without viewing the ring 362 or 364.

Figure 14:
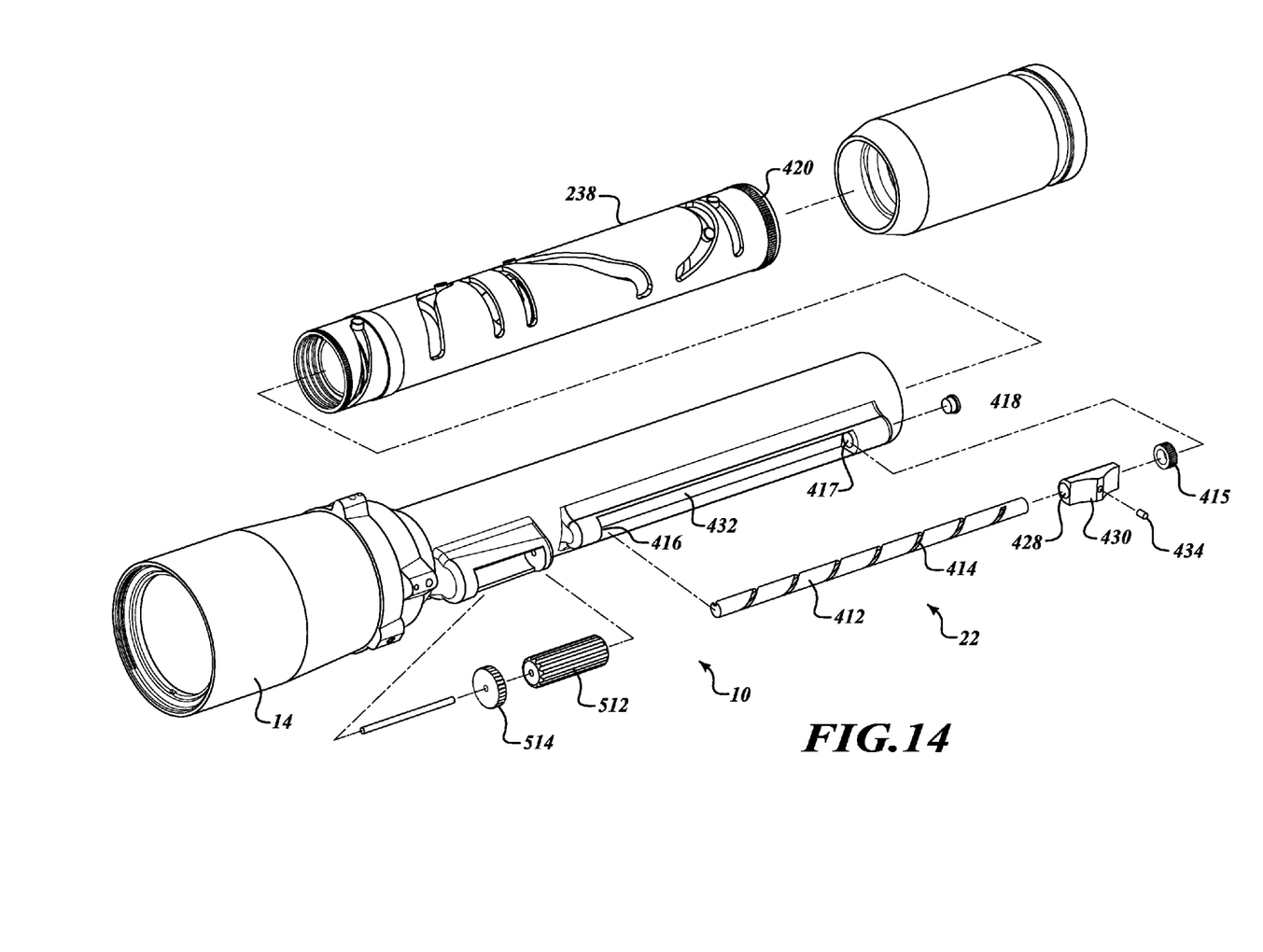
FIG. 14 is an exploded perspective view of the scope of FIG. 1 showing the zoom actuator assembly and the focus actuator assembly.
Figure 15:
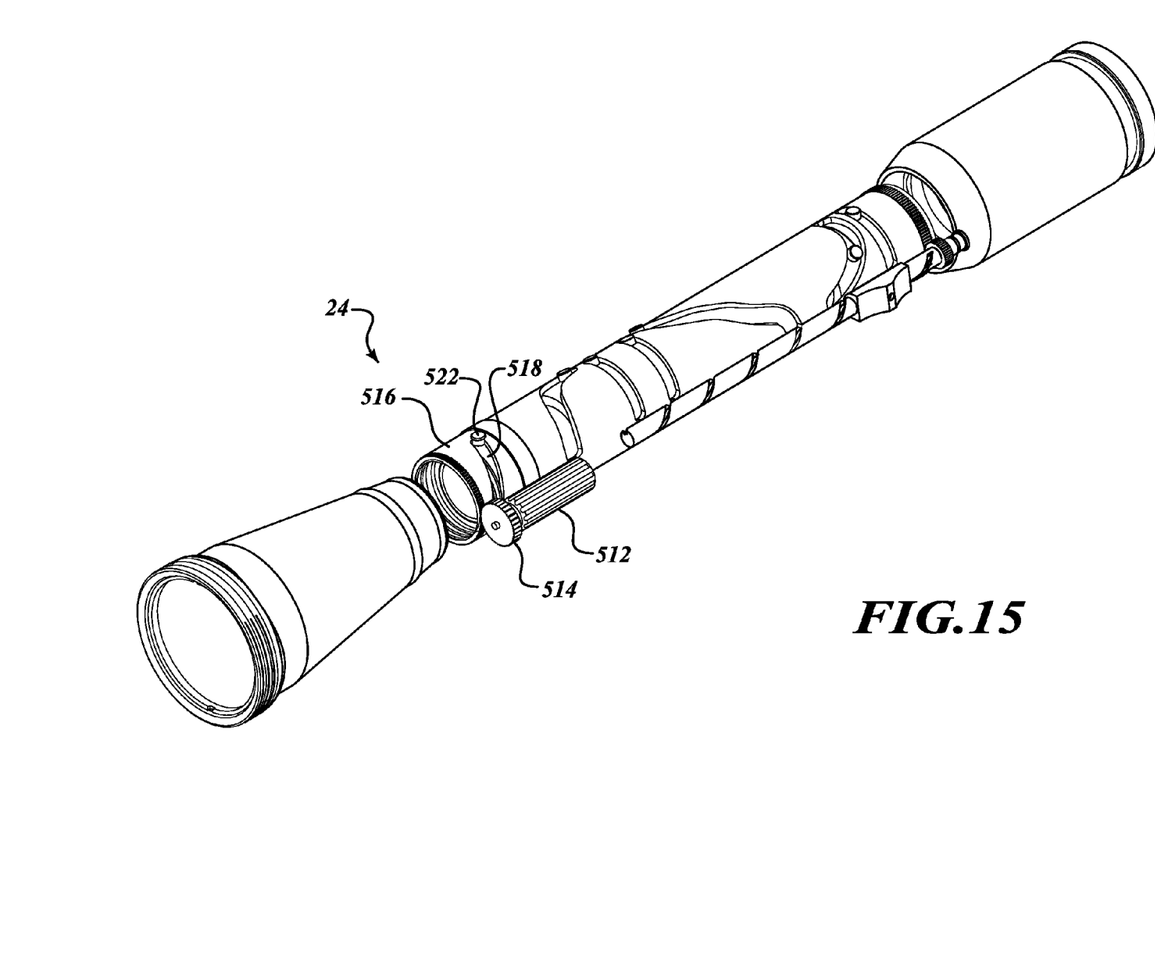
FIG. 15 is a perspective view of the rifle scope of FIG. 1, showing the zoom actuator and focus actuator engaged with the zoom mechanism and focus mechanism, respectively, and with the central housing removed, for greater clarity of presentation.
Figure 16A:
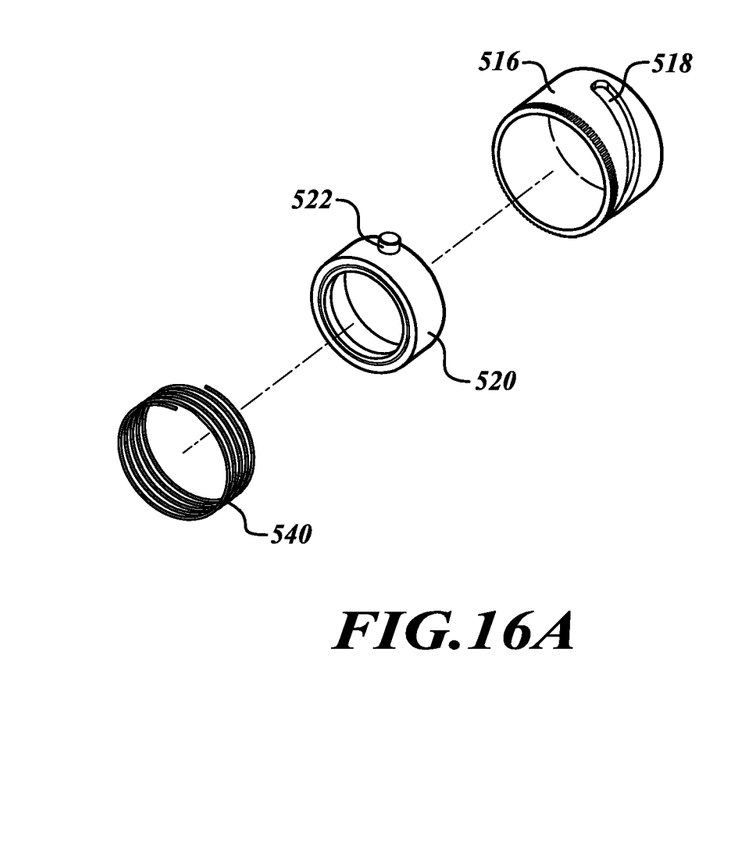
FIG. 16A is an exploded view of the focus mechanism of the scope of FIG. 1.
Figure 16B:
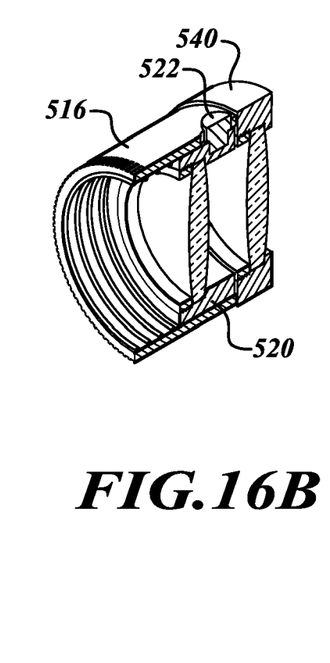
FIG. 16B is a perspective sectional view of the focus mechanism of FIG. 16A.

Referring to FIGS. 14 and 15, the zoom actuator mechanism 410, includes a shaft 412, having a helical groove 414 formed into it and a gear 415 at one end. Shaft 412 is mounted in a small recess 416 and a large recess 417, which accommodates gear 415. During assembly, after shaft 412 has been placed in recesses 416 and 417 a threaded plug 418 is installed into the end of the large recess 417, to retain shaft 412. When so mounted gear 415 contacts a set of matching teeth 420 defined on the surface of cam tube 238, through an opening (not shown) in the large recess 417.

Shaft 412 is threaded through an aperture 428 in a slider 430, which is seated in a groove 432 formed in the exterior of scope housing 12. A peg 434 is mounted in slider 430 and engages groove 414, so that as slider 430 is moved along groove 432, shaft 412 is rotated. In turn gear 415 turns cam tube 238 by way of teeth 420. In a preferred embodiment slider 430 has a range of motion of greater than 2 cm.

Figure 17:
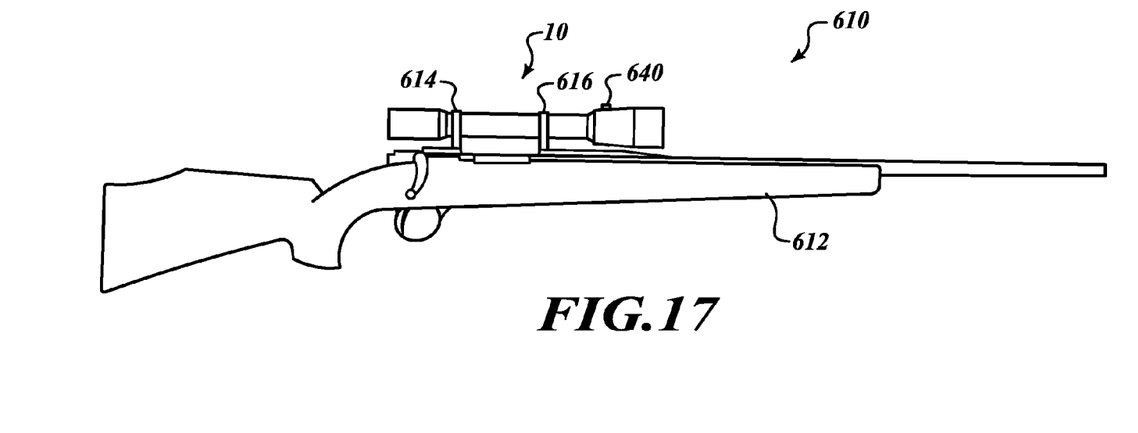
FIG. 17 is a side view of a scope, according to the present invention, mounted on a rifle.
Figure 18:
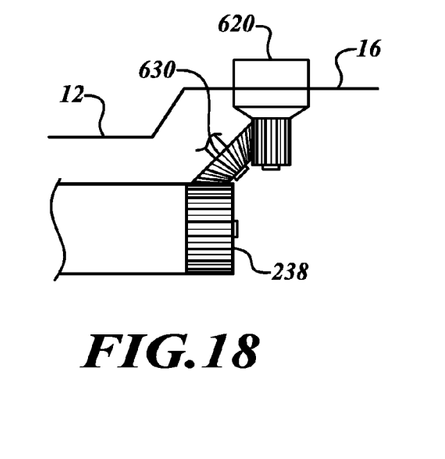
FIG. 18, is a side sectional view of an alternative zoom actuation mechanism.

Referring to FIG. 18, in an alternative preferred embodiment the zoom adjustment takes the form of a knob 620 at the ocular end of the scope, driving cam tube 238 by means of a bevel gear 630. Referring to FIG. 17, this embodiment is adapted for use mounted on a rifle 612, by way of a scope mount having a rear mounting ring 614 and a front mounting ring 616. FIG. 17, also shows an elevation adjust knob 640, which performs the same function in similar manner to elevation adjust ring mechanism 20, with rotation pushing an element against assembly 310. Because of the far forward placement of knob 640, the scope may be installed in a far forward position, giving greater eye relief, without a concern of having conflict between a windage and elevation knob tower and the front mounting ring 616, as has heretofore been the case. Skilled persons will appreciate that this placement would be also possible with windage and elevation adjust ring mechanisms 18 and 20. The two mounting ring configuration is typically used by hunters and other recreational shooters. The zoom actuator mechanism 410 is designed to be used with military rifles, which are mounted without the use of mounting rings.

In either the slider or knob embodiment, the zoom actuation scheme permits cam tube 238 to be rotated by greater than a single full rotation. This permits the design of cam tubes having slots in the shape of irregular helices that wrap about the cam tube 238 by more than a complete rotation. This permits an additional freedom of design, potentially permitting a greater range of erector lens movement.

Referring to FIGS. 14, 15, 16A and 16B the focus mechanism 510 of the scope 10, includes a focus-adjustment roller 512, which is partially protected by roller housing 513. Also, roller 512 is rigidly attached to a drive gear 514, which in turn drives a focus cam tube 516 having teeth matching those of drive gear 514. Tube 516 also defines a cam-tube slot 518. A focus lens assembly 520 includes a cam-slot follower pin 522, so that as cam tube 516 rotates, lens assembly 520 is moved either forward or back, thereby changing the focus of scope 512. A coil spring 540 (FIG. 16A) urges pin 522 to contact the rear of slot 518, thereby preventing potential slop in the position of lens assembly 520 caused by slight room for forward and backward movement of pin 522 in slot 518. Skilled persons will recognize that the cam-tube slot 518 can be designed so as to create a desired focus profile, so that it is possible to finely adjust the focus, even at a long range. In one preferred embodiment a linear relationship is created between rotation of roller 512 and focus range, with possible ratios being one complete rotation for every 50, 75 or 100 meters, from a range of 10 meters to a range of 400 meters or more. With a relationship like one of these, at any range a small tweak to focus roller 512 will provide a fine adjustment to the focus range.

In one preferred embodiment a first focus roller assembly, having a relatively large diameter drive gear. for speedy, gross adjustments of the focus, and a second focus roller assembly is provided, displaced around the body of the scope from the first focus roller assembly, with a relatively small diameter drive gear for fine adjustment of the focus.

A scope constructed in accordance with the preceding disclosure, has a number of advantages relative to current scope design. First, such a design will tend to be far easier to manufacture, resulting in a lower defect rate and ultimately less expense. First, a high zoom ratio scope built with currently available methods drives very tight tolerances in both the lenses used and the cam tube slots. This is because many of the lenses are used quite differently over different portions of the zoom range, so that at a first zoom position, for example, the lens curvature near the center of the lens may be absolutely critical, whereas at a second zoom position the curvature towards the exterior becomes critically important. Accordingly the shape of the lens must be very close to the ideal lens shape specified. The tighter the tolerance, the harder it is to meet the requirement in lens manufacturing and the more time and effort must be spent after each lens is manufactured, ensuring that it meets its tolerances. Also, the range of lens movement is much greater in previous designs for high zoom-ratio scopes, and with similar rationale to the need for tight lens tolerances, the cam tube slots must be machined with exacting precision.

Fortunately, because the windage and elevation adjustment mechanisms 18 and 20 alter the position of the objective assembly instead of a cam tube, as in most previous scopes, the cam tube 238 may be made with a larger diameter, permitting a thicker circumferential wall. A thicker-walled cam tube is easier to accurately machine, and is also able to withstand the shock of recoil better than a thinner-walled cam tube. Whereas currently available designs may have a wall-thickness of as little as 0.65 mm. The cam tube 238 of scope 10 has, in a preferred embodiment, a circumferential wall-thickness of 1 mm, 1.5 mm or greater. In a preferred embodiment a similar wall thickness is used in focus cam tube 516. In one preferred embodiment scope 10 is made with sufficient wall thicknesses for tubes 238 and 516 that it can be used with a 0.50 (inch) caliber rifle. In the prior art, this has typically not been achievable because of the powerful recoil of this type of rifle.

Moreover, a design using two erector lens assemblies permits a reduction in the amount of curvature in the cam tube slots making it possible to use cam tube slot followers (pins 232, FIGS. 12A and 12B) that have a greater length than would otherwise be possible. In one preferred embodiment of scope 10, pines 232 are replaced with elliptical slot followers that are 7 mm long. Longer slot followers have greater durability because they spread the force of the rifle recoil over a larger area of the slot follower.

Additionally, windage and elevation adjustment assemblies 18 and 20 permit a shooter to check, and even modify, the windage and elevation adjustment without removing his aiming eye from the scope. The greater size of marking rings 362 and 364 in comparison with currently available knobs, makes them relatively easy to manipulate. Moreover, in a preferred embodiment it is only possible to turn the windage and elevation marking rings 362 and 364 by less than a full rotation, thereby avoiding the problem of ambiguity in reading the windage and elevation adjustments that systems that permit more than a full rotation typically incur.

Military rifles are typically light enough (less than 4 kg) to be supported by the same hand that is pressing the trigger, leaving the other hand (the left hand for a right handed shooter) free. Also, a scope is attached to a military rifle without mounting rings, leaving more of the side of the scope accessible. Zoom actuator assembly 22 is located so that when scope 10 is attached to a military rifle, a shooter may adjust the zoom with his free left hand (for a right handed person). An alternative preferred embodiment is optimized for left handed soldiers, and has the actuator assembly located on the opposite side of the scope from the way it is shown in the drawings. In addition, the relatively lengthy slider range provides a good accuracy and precision of adjustment.

The embodiment shown in FIG. 18, wherein a knob 530 is positioned on the ocular portion of the scope, is optimized for hunters and other recreational shooters. As a hunter's scope is typically attached to the rifle with mounting rings, having a slider assembly 22 could prove impractical. Accordingly, a knob is provided on the right side of the scope, so that a right-handed shooter can easily use his right hand to reach up and adjust the knob. An alternative preferred embodiment is optimized for use by a left-handed shooter and has the knob positioned on the left-hand side of the scope. Either the slider or the knob embodiment, however, permit the cam tube to be rotated by a full 360°, as opposed to a typical scope, in which the cam tube can only be rotated by a mere 180°. The greater rotation lens movement to be performed over a greater rotational distance, easing design constraints.

The design of the focus assembly permits a focal profile that is optimized for the particular scope. For some scopes the far range focus may be very important, and it is advantageous to shape the focus cam slot so that a movement of the focus roller 512 translates in an optimal manner to focus adjustment. Also, the location of the focus roller 512 on the left hand side of the scope, from the perspective of a shooter, permits a military rifle shooter to adjust the focus with his free left hand, just as with the zoom actuator assembly 22. In all, the windage and elevation, the focus and the zoom, can all be adjusted by the user of a military rifle, with his free left hand.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A scope having a zoom mechanism, comprising:
    (a) a cam tube holding an optical train of lenses whose relative positions change when said cam tube is rotated, causing an image seen through the scope to expand or contract;
    (b) a gear operatively connected to said cam tube and positioned so as to rotate said cam tube when said gear is rotated;
    (c) an actuator operatively connected to said gear so that said actuator causes said gear to turn when a user moves said actuator; and
    (d) wherein said actuator has a range of movement that permits said actuator to operatively rotate said cam tube by more than 300 degrees; and
    (e) wherein said cam tube defines a set of irregular helical slots and wherein said slots extend for greater than 300 degrees around said cam tube.

2. The scope of claim 1, wherein said actuator has a range of movement that permits said actuator to operatively rotate said cam tube by more than a complete rotation and said cam tube irregular helical slots extend for greater than a full rotation around said cam tube.

3. The scope of claim 1, wherein said scope further has an ocular portion having a housing and said actuator is a knob on the right hand side of said ocular portion housing, from the perspective of a shooter using said scope.

\* \* \* \* \*